United States Patent [19]

Arnold, Jr. et al.

[11] Patent Number: 4,832,881
[45] Date of Patent: May 23, 1989

[54] LOW DENSITY MICROCELLULAR CARBON FOAMS AND METHOD OF PREPARATION

[75] Inventors: Charles Arnold, Jr.; James H. Aubert; Roger L. Clough; Peter B. Rand; Alan P. Sylwester, all of Albuquerque, N. Mex.

[73] Assignee: The United States of America as represented by the United States Department of Energy, Washington, D.C.

[21] Appl. No.: 209,168

[22] Filed: Jun. 20, 1988

[51] Int. Cl.$^4$ .............................................. C01B 31/00
[52] U.S. Cl. .................................. 264/29.7; 264/29.1; 423/445; 423/449; 502/101; 502/180; 502/416; 502/418; 521/918
[58] Field of Search ...................... 264/29.7, 29.1; 423/445, 449; 502/101, 180, 416, 418; 521/918

[56] References Cited

U.S. PATENT DOCUMENTS

| | | | |
|---|---|---|---|
| 3,345,440 | 10/1967 | Googin et al. | 264/29 |
| 3,516,791 | 6/1970 | Evans | 502/180 |
| 3,518,206 | 6/1970 | Sowards et al. | 502/180 |
| 3,574,548 | 4/1971 | Sands et al. | 23/209.4 |
| 4,024,226 | 5/1977 | Lersmacher et al. | 423/449 |
| 4,080,413 | 3/1978 | Layden et al. | 264/29.2 |
| 4,118,341 | 10/1978 | Ishibashi et al. | 252/438 |
| 4,205,055 | 5/1980 | Maire et al. | 502/180 |
| 4,225,463 | 9/1980 | Unger et al. | 502/418 |
| 4,263,268 | 4/1981 | Knox et al. | 502/418 |
| 4,430,451 | 2/1984 | Young et al. | 521/64 |
| 4,439,349 | 3/1984 | Everett et al. | 502/180 |
| 4,540,678 | 9/1985 | Sutt, Jr. | 502/180 |
| 4,673,695 | 6/1987 | Aubert et al. | 521/64 |
| 4,753,717 | 6/1988 | Yata et al. | 502/416 |
| 4,756,898 | 7/1988 | Hopper et al. | 502/180 |
| 4,775,655 | 10/1988 | Edwards et al. | 264/29.1 |

OTHER PUBLICATIONS

N. Grassie, "Degradation", *Encyclopedia of Polymer Science and Technology*, vol. 4, pp. 647–716, (1966).

*Primary Examiner*—Morton Foelak
*Attorney, Agent, or Firm*—Armand McMillan; James H. Chafin; William R. Moser

[57] ABSTRACT

A low density, open-celled microcellular carbon foam is disclosed which is prepared by dissolving a carbonizable polymer or copolymer in a solvent, pouring the solution into a mold, cooling the solution, removing the solvent, and then carbonizing the polymer or copolymer in a high temperature oven to produce the foam. If desired, an additive can be introduced in order to produce a doped carbon foam, and the foams can be made isotropic by selection of a suitable solvent. The low density, microcellular foams produced by this process are particularly useful in the fabrication of inertial confinement fusion targets, but can also be used as catalysts, absorbents, and electrodes.

27 Claims, No Drawings

LOW DENSITY MICROCELLULAR CARBON FOAMS AND METHOD OF PREPARATION

The Government has rights in this invention pursuant to Contract No. DE-AC04-76DP00789 awarded by the U.S. Department of Energy.

FIELD OF THE INVENTION

The invention relates to the preparation of low density microcellular carbon foams which are useful for forming targets for inertial confinement fusion experiments, and which can be used as catalysts, absorbents, electrodes, and in other applications.

BACKGROUND OF THE INVENTION

It is known in the prior art that low density microcellular polymer foams can be prepared which are useful for foaming targets for inertial confinement fusion. For example, U.S. Pat. No. 4,430,451 (Young et al), discloses such a foam which is prepared from poly (4-methyl-l-pentene) and a bibenzyl solvent.

It is also known in the prior art how to prepare porous carbon from polyacrylonitrile (PAN) and other acrylonitrile-based materials. Examples of such porous carbon are disclosed in U.S. Pat. Nos. 4,439,349 (Everett et al) and 4,118,341 (Ishibashi et al) wherein acrylonitrile polymers are used in the preparation of porous carbon adsorbents. The porous carbon materials disclosed in these patents are characterized by high densities and extremely small pore sizes, and thus these materials offer great resistance to the flow of gases or liquids through them. Hence, they cannot be used successfully as catalyst supports in a catalytic flow reactor, or in other similar applications. It should also be noted that the prior art materials are not structural foams.

What is desired, therefore, is to develop a low density, microcellular carbon foam prepared from acrylonitrile-based materials which can be used successfully not only in the fabrication of inertial confinement fusion targets, but as a catalyst support, an absorbent, a filter, an electrode, and in a variety of other applications as well.

SUMMARY OF THE INVENTION

It has been discovered that a low density, open-celled microcellular carbon foam with superior qualities can be prepared by dissolving a carbonizable polymer or copolymer in a solvent at a temperature sufficient to effect complete dissolution of the polymer or copolymer, followed by pouring the solution into a mold, cooling the solution, removing the solvent to produce the foam, and then carbonizing the polymer or copolymer in a high temperature oven to produce the carbon foam. The low density, microcellular carbon foams produced in this manner are useful in the fabrication of inertial confinement fusion targets, and for a variety of other applications, including use as a catalyst support, as an absorbent, or as an electrode. These foams can be made isotropic when so desired by choosing a solvent which will ensure that liquid phase separation occurs while the polymeric solution is cooled in the mold.

DETAILED DESCRIPTION OF THE PREFERRED EMBODIMENTS

According to the method of the present invention, a low density, open-celled microcellular carbon foam is prepared by dissolving a carbonizable polymer or copolymer in a solvent at a temperature sufficient to effect complete dissolution. Preferably, the materials used for this process will comprise acrylonitrile-based polymers, such as polyacrylonitrile (PAN), and acrylonitrile-based copolymers, such as polyacrylonitrile-co-maleic anhydride. However, many other suitable carbonizable polymers can be employed in the present invention. Among these suitable polymers are phenolics, guar gums, polyesters, poly(furfuryl alcohol), polyimides, cellulose polymers (such as Rayon), polyamides, polyacrylethers, polyphenylenes, polyacenaphthalenes, polytriadiazoles and polyvinylpyridines.

The dissolution of the carbonizable polymeric materials in the solvent is preferably carried out at a temperature of from about 100° to about 200° C. It is particularly preferred that the dissolution temperature be around 150° to 160° C. After dissolution of the polymer or copolymer, the solution is poured into a mold and is then cooled. A typical cooling rate or quench is about 10° C. per minute. After the quench, the solvent is removed from the solution and the polymer or copolymer can be carbonized to produce the low density microcellular foams of the present invention.

The solvent used in the process of the present invention is chosen based on the type of foam desired. When isotropic foams are desired, the solvent is chosen so that liquid phase separation occurs during the quench. The dissolved polymeric solution is cooled in the mold so that liquid phase separation occurs. Cooling may be continued until the solvent freezes in which case the solvent is removed by sublimation under vacuum (freeze-drying). If the solvent is not frozen, then it may be removed by extraction. The isotropic low density, open-celled microcellular carbon foam is then produced by carbonizing the desired polymeric materials following removal of the solvent. A number of solvents have been used successfully in the process of the present invention. Preferred solvents for freeze-drying to be used in the preparation of the isotropic foams are: maleic anhydride, 70–90% methyl sulfone (80% preferred) with 10–30% cyclohexanol (20% preferred), 85–95% methyl sulfone (around 93% preferred) with 5–15% (around 7% preferred) water, and 40–60% (50% preferred) methyl sulfone with 60–40% (50% preferred) norcamphor (all solvent percentages are given as wt./wt. except for aqueous methyl sulfone, which is given as wt./volume). Preferred solvents which can be extracted to prepare isotropic foams are: 75–95% dimethyl formamide (84% preferred) with 5–25% (16% preferred) water (volume/volume), 70–90% dimethyl formamide (78% preferred) with 10–30 % (22% preferred) ethylene glycol, 70–90% 1-methyl-2-pyrrolidone (78% preferred) with 10–30% (22% preferred) ethylene glycol and 40–65% succinonitrile (55% preferred) with 35–60% maleic anhydride (45% preferred).

Alternatively, anisotropic (or directional) foams can also be prepared using the method of the present invention. When anisotropic foams are desired, the solvent is chosen so that the carbonizable polymer or copolymer solution will not liquid phase separate during the cooling step, and the phase separation occurs primarily by solvent freezing. An example of a solvent which can be used to prepare anisotropic foams is methyl sulphone. As in the previous cases, after solvent removal, the resulting anisotropic microcellular foam is ready to be carbonized.

The carbonizable polymeric materials prepared as indicated above are preferably carbonized in a high-temperature oven. Various carbonization schemes are possible, but it is preferred that the polymer or copolymer be pretreated after removal of solvent and before carbonizing by subjecting the foam to an oxygen or air atmosphere for about 12-24 hours at temperatures of from about 180°-260° C. (220° preferred). This preliminary step is necessary to allow a higher graphitic carbon content in the final carbonized foam. Following the pretreatment, the polymeric materials are preferably heated to a temperature of from about 500°-2500° C. for about 6-10hours in the presence of an inert gas. Carbonization is advantageously carried out by heating the foams slowly (5° C. per minute) under a continuous flow of the inert gas. It is preferred that the gas used be argon, but other inert gases such as nitrogen, neon, krypton or xenon are also suitable. During this heating process, the foams will shrink and therefore densify to an extent depending upon the carbonization scheme. This effect can be offset by making the starting polymer foam at a lower density than required in the resulting carbon foam.

The final properties of the carbonized foams of the present invention are primarily dependent on the thermal pretreatment and the carbonization conditions chosen. For a low-density PAN foam pretreated at 220° C. for approximately 24 hours and carbonized at various temperatures, it was observed that the percentage of carbon directly increased with increasing carbonization temperature. This can be observed in Table I. Other physical properties of the low-density PAN foams were also observed to vary with carbonization temperature, such as foam densification which was greater at the higher temperatures. The physical properties of carbonized PAN foams at particular carbonization temperatures can be observed in Table II.

The balance between uniform shrinkage of PAN foam (typically 20 to 30% linear shrinkage) and mass loss during carbonization allows very low density carbon foams (typically 0.04 to 0.50 g/cc) to be prepared by the process of the present invention. Due to the shrinkage during carboniztion, very small-celled (typically 10 microns or less) carbon foams can be prepared at these low densities. The BET surface areas of carbonized foams were observed to decrease with increasing carbonization temperatures (see Table II). This may have been due to annealling of micro-porosity in the struts of the carbon foams at higher temperatures.

For applications where the carbonized foams must be machined to close tolerances (e.g., hemispherical targets for inertial confinement fusion experiments), it is desirable to have a material which retains dimensional stability (e.g., low thermal expansion). The coefficients of thermal expansion (CTE) of the carbonized foams (see Table II) were measured over a wide temperature range (−55° to 150° C.). Foams carbonized at less than 1000° C. showed non-linear (sigmoidal) response. This non-linear behavior may be due to desorption of gases or adsorbed water from the high active surface areas of these low temperature carbonized foams. The measured linear coefficients are consistent with literature values for partially graphitized glassy carbon which are typically 3 to $4 \times 10^{-6}/°$ C. The low-density carbonized PAN foams produced in accordance with the present invention have been readily machined to close tolerances, and possess excellent dimensional stability.

TABLE I

| \multicolumn{5}{c}{Elemental Analysis of Carbonized PAN*} |
|---|---|---|---|---|
| Temp.(°C.) | % C | % H | % N | % O |
| 600 | 70.13 | 0.85 | 18.36 | 10.64 |
| 800 | 75.41 | 0.23 | 13.43 | 9.93 |
| 1000 | 90.60 | <0.05 | 5.03 | 2.90 |
| 1200 | 96.93 | <0.05 | 1.75 | 0.61 |
| 1600 | >99.99 | — | — | — |

*220° C. Pretreatment, weight percents, oxygen content deterined by neutron activation analysis.

TABLE II

| Properties of Carbonized PAN Foams* | | | | |
|---|---|---|---|---|
| Temp. (°C.) | Initial Density (mg/cc) | Final Density (mg/cc) | BET Surface ($m^2/g$) | CTE ($\times 10^{-6}$) (L/L°C.) |
| 800 | 40.0 | 54.4 | 76.6 | 6.0 (sigmoidal) |
| 1000 | 42.0 | 58.8 | 55.7 | 4.0 |
| 1100 | 37.8 | 56.5 | 48.9 | 3.7 |
| 1200 | 35.2 | 53.0 | 8.2 | 3.2 |

*Maleic anhydride solvent, 220° C. pretreatment.

The microcellular carbon foams of the present invention can be "doped" or "loaded" by adding a metal or other additive (e.g., as stabilizers, dyes, etc.) into the foam in various ways and at various steps of the process. Preferably, the additive will be added to the foam at the time the initial solution is prepared, in the manner disclosed in U.S. Pat. No. 4,673,695, incorporated herein by reference. Generally, additives can be added into a previously prepared polymer foam by soaking the foam in a solution containing the additive and subsequently removing the solvent. In that case, the carbonization scheme must be designed for the presence of the additive. Alternatively, various materials can be added to an already carbonized foam. The additives can be in the form of salts (possibly water soluble), soluble organic compounds, metal-containing compounds, or particulates (e.g. metal particulates). In all cases, the solvent for the additives must not be a solvent for the polymer or foam.

It is preferred that the metal or other additive used be soluble, and these soluble additives can be added to the microcellular foam by dissolving or dispersing them in the solution of dissolved carbonizable polymer or copolymer. In general, when a metal-containing additive is to be incorporated into the carbon foams at initial polymer solution in order to yield foams with metallic residues, the additive should have the following properties:

(1) Solubility or dispersability in the solvent system chosen;
(2) Non-volatility during solvent removal and thermal treatment;
(3) Thermally degradable with loss of ligands rather than volatilization; and
(4) Metal residue from the additive has refractory properties at the final carbonization temperature.

In these cases, the carbonization scheme should be designed for the presence of the additives. It is particularly preferred to use a crystalline non-volatile organometallic compound, such as an acetylacetonate (e.g., palladium acetylacetonate), as an additive in the carbon foams of the present invention. However, other metal-containing compounds can be used successfully, including, e.g., ammonium salts, oxalates, carboxylates, nitrates, chlorides, oxides, cycloocatadienyl compounds, and micron to submicron-sized insoluble particulates.

The open-celled microcellular carbon foams produced in accordance with the present invention have densities of from about 30–500 mg/cc. These foams have potential applications as catalysts, absorbents, in ion exchange, in liquid, gas, and size exclusion chromotography, as deodorizers, as electrodes, and in the fabrication of inertial confinement fusion targets and targets for the pulsed-power driven X-ray laser. Because these foams are microcellular (cell size uniform and less than about 10 micrometers and typically 5 micrometers for isotropic foams), they offer the possibility of being superior to prior materials in the applications mentioned. In addition, because the foams are open-celled, they offer very little resistance to the flow of gases or liquids through them. Thus, they can allow very high throughputs in a catalytic flow reactor. A carbonized microcellular PAN foam doped with palladium prepared in accordance with the method of the present invention has been tested and shown to be useful as an efficient hydrogenation catalyst. In general, these microcellular carbon foams will be useful as substrates for catalysts because of their high surface area, high-temperature resistance, and chemical inertness.

The following examples are provided as illustrative of the present invention and are not intended to limit its scope in any way:

EXAMPLE 1

To a 3% (weight percent) solution of PAN (molecular weight of 150,000) in 80:20 methyl sulfone/cyclohexanol solvent at 160° C. is added a crystalline non-volatile organometallic compound such as palladium acetylacetonate (Pd ac-ac). Pd ac-ac has been added at 0.01 to 2% by weight. After the Pd ac-ac has dissolved, the solution is poured into a mold and quenched to 25° C. This resuslts in thermally-induced phase separation of PAN followed by solidification of the solvent. Removal of the solvent by sublimation (at temperatures of 50° C. to 85° C.) under vacuum (less than 1 torr) results in doped PAN foams of low initial densities (31 to 50 mg/cc). Thermal oxidative pre-treatment of the foam for 16–24 hours at 200° C. in a forced air oven results in a dark brown coloration, 5–10% linear shrinkage, and 2–5% weight loss. Carbonization of the foam is achieved by slow heating (5° C./minute) to 600°–1200° C. under a continuous flow or argon. The furnace is held at the final carbonization temperature for 8 hours and then slowly cooled. The densities of the resulting carbonized PAN foams are typically 50 to 70 mg/cc.

Electron microscopy studies have revealed that an even distribution of palladium forms on the carbon foam matrix. The presence of Pd metal has been confirmed by X-ray defraction.

A palladium doped carbonized PAN foam as described above has been demonstrated as a hydrogenation catalyst. The catalytic reduction of 1, 5-hexadiyne (0.10 mole) in the presence of 100 mg of Pd doped carbonized PAN foam (88 mg/cc density, 5% Pd by weight, $5 \times 10^{-5}$ mole Pd) under hydrogen atmosphere (35 psi initial pressure) proceeds quickly (approximately 48 hours) to 1, 5-hexadiene and more slowly to hexane in about 220 hours. This selectivity in catalytic reduction of alkynes to alkenes has been demonstrated previously with convention Pd on carbon catalyst.

EXAMPLE 2

A polyacrylonitrile (molecular weight approximately 150,000) solution was prepared by adding 4.67 grams of polyacrylonitrile (Aldrich Chemical Co.) to 91 cc of DMF (N,N-dimethyl formamide). At 150° C., 26 cc of ethylene glycol was slowly added to the solution. When the solution was clear and homogeneous, it was poured into a warm rectangular mold and quenched to room temperature. During the quench the solution clouded and gelled. Solvent in the gel was first exchanged with methanol by soaking in an excess of methanol for two days. The methanol in the gel was then exchanged for liquid carbon dioxide in a high pressure soxhlet extractor. The carbon dioxide was finally removed super critically, resulting in a dry polyacrylonitrile foam of density 0.05 grams/cc and dimensions 14.6 cm × 5 cm × 1.3 cm. The cell size of the foam is 0.5 micrometers and the morphology of the foam is very uniform and isotropic. This foam was oxidatively pretreated at 220° C. for 18 hours and then carbonized in an argon atmosphere at 1200° C. for 8 hours. The carbonization cycle utilizes a slow ramp of 5° C./min up to and down from this temperature. The carbonized foam has a density of 0.155 grams/cc and a cell size under 0.5 micrometers.

EXAMPLE 3

A carbon foam was prepared exactly as described in Example 2 with the exception that the solvent used consisted of 86% DMF and 14% water.

EXAMPLE 4

A carbon foam was prepared exactly as in Example 2 except that the solvent was 1-methyl-2-pyrrolidinone rather than DMF. 4.67 grams of polyacrylonitrile was dissolving in 96 cc of 1-methyl-2-pyrrolidinone and to this was added 24 cc of ethylene glycol. The resulting carbon foam had a density of 0.115 grams/cc and a cell size of under 0.5 micrometers.

EXAMPLE 5

A carbon foam was prepared using the polymer polybenzimidazole (PBI) (obtained from Celanese). The polymer, PBI, (4.0 grams) was dissolved in 90 cc of DMF and to this solution was slowly added 10 cc of ethylene glycol. The solution was poured into a warm rectangular mold and cooled to room temperature at which time it formed a cloudy gel. The gel was extracted in the same manner as the gel described in Example 2. The resulting dry foam had a density of 0.088 grams/cc and dimensions of 12 cm × 4 cm × 0.8 cm. The foam was oxidatively stabilized at 465° C. for 2 hours and then carbonized at 1200° C. in an argon atmosphere for 8 hours utilizing a slow ramp (5° C./min up and down from the soak temperature). The carbonized foam had a density of 0.78 grams/cc and dimensions of 1.6 cm × 4.9 cm × 0.3 cm.

EXAMPLE 6

An anisotropic carbon foam was prepared by dissolving 0.9 grams of polyacrylonitrile in 22.5 grams of methyl sulfone and 2.6 grams of n-dodecanol. The solution was poured into a warm rectangular mold and cooled to room temperature there the solvent methyl sulfone was a crystalline solid. The methyl sulfone and n-dodecanol were removed by sublimation and evaporation respectively at 85° C. under vacuum. The resulting polyacrylonitrile foam was very anistropic, having a preferred morphological direction. The morphology was sheet-like with the sheets orientated in the direction in which heat was removed from the mold during cooling. Typical spacings between the sheets were about 50 micrometers. This foam was carbonized according to the scheme described in Example 2 resulting in a carbon foam with the same, very directional, morphology.

EXAMPLE 7

An isotropic carbon foam was prepared by dissolving 5.0 grams of polyacrylonitrile in 220.0 grams of maleic anhydride at 160° C. The solution was outgassed by applying vacuum, poured into a warm rectangular mold and cooled at room temperature. The maleic anhydride was removed by sublimation at 40° C. in vacuum. The resulting polyacrylonitrile foam had density of 0.04 gram/cc, a very uniform isotropic morphology and a cell size of about 5 micrometers. The dimensions of the dry foam were 17.5 cm × 5.5 cm × 2.0 cm. The foam was thermally pretreated at 220° C. and carbonized as described in Example 2 resulting in the same homogeneous, isotropic morphology. The final carbonized foam had a density of 0.06 gram/cc and dimensions of 11.5 cm × 3.6 cm × 1.3 cm.

What is claimed is:

1. A method of preparing a low-density, open-celled microcellular carbon foam comprising the steps of:
   (a) dissolving a carbonizable polymer or copolymer in a solvent at a temperature sufficient to effect complete dissolution;
   (b) pouring the dissolved polymeric or copolymeric solution into a mold;
   (c) quenching the solution in order to induce phase separation between the polymer and solvent to form a gelled open-celled foamed structure from the polymer phase wherein the solvent is impregnated into the pores of the foam;
   (d) removing the solvent; and
   (e) carbonizing the polymer or copolymer in a high temperature oven to obtain an open-celled carbon having a pore size equal to or less than 10 microns.

2. A method according to claim 1 wherein the dissolution step is carried out at a temperature of from about 100° to 200° C.

3. A method according to claim 1 wherein an acrylonitrile-based polymer is dissolved in the solvent.

4. A method according to claim 3 wherein the acrylonitrile-based polymer comprised polyacrylonitrile.

5. A method according to claim 1 wherein an acrylonitrile-based copolymer is dissolved in the solvent.

6. A method according to claim 5 wherein the acrylonitrile-based copolymer is polyacrylonitrile-co-maleic anhydride.

7. A method of according to claim 1 wherein the carbonizable polymer is selected from the group consisting of phenolics, guar gums, polyesters, poly(furfuryl alcohol), polyimides, cellulose polymers, polyamides, polyacrylethers, polyphenylenes, polyacenaphthalenes, polytriadiazoles, and polyvinylpyridines.

8. A method according to claim 1 wherein the solvent comprises maleic anhydride.

9. A method according to claim 1 wherein the solvent comprises a mixture of methyl sulfone and cyclohexanol.

10. A method according to claim 9 wherein the solvent comprises 70-90% methyl sulfine with 10-30% cyclohexanol by weight.

11. A method according to claim 1 wherein the solvent comprises aqueous methyl sulfone.

12. A method according to claim 11 wherein the solvent comprises a mixture of 85-95% methyl sulfone with 5-15% water (wt./vol.).

13. A method according to claim 1 wherein the solvent comprises aqueous dimethyl formamide.

14. A method according to claim 13 wherein the solvent comprises a mixture of 75-95% dimethyl formamide and 5-25% water (vol./vol.).

15. A method according to claim 1 wherein the solvent is removed by sublimation under vacuum.

16. A method according to claim 1 wherein the carbonizable polymer or copolymer solution forms into a gel during the cooling step, and wherein the solvent is removed by extraction.

17. A method according to claim 1 wherein the carbonizable polymer or copolymer is carbonized by subjecting the polymer or copolymer after removal of solvent to an oxygen atmosphere for about 12-24 hours at a temperature of from about 180°-160° C., then subjecting the polymer or copolymer to a temperature of from about 500°-2,500° C. for 6-10 hours in the presence of an inert gas.

18. A method according to claim 17 wherein the inert gas is argon.

19. A method according to claim 1 further comprising the addition of an additive to the microcellular carbon foam.

20. A method according to claim 19 wherein the additive is selected from the group consisting of salts, soluble organic compounds, metal-containing compounds, and particulates.

21. A method according to claim 19 wherein the additive is added to the microcellular foam by dissolving or dispersing the additive in the solution of dissolved polymer or copolymer.

22. A method according to claim 20 wherein the additive is a metal-containing compound.

23. A method according to claim 22 wherein the additive is a crystalline non-volatile organometallic compound.

24. A method according to claim 23 wherein the additive is an acetylacetonate.

25. A method according to claim 24 wherein the additive is palladium acetylacetonate.

26. A method according to claim 22 wherein the additive is selected from the group consisting of ammonium salts, oxalates, carboxylates, nitrates, chlorides, oxides, cycloocatadienyl compounds, and micron to submicron-sized insoluble particles.

27. A method according to claim 1 comprising the steps of
   (c) quenching the solution so that liquid phase separation occurs, and continuing to cool the solution until the solvent freezes; and
   (d) removing the solvent by sublimation under vacuum.

* * * * *